(12) United States Patent
Amphlett (10) Patent No.: US 7,303,308 B2
(45) Date of Patent: Dec. 4, 2007

(54) LIGHTING APPARATUS

(75) Inventor: David Richard Amphlett, Cassington (GB)

(73) Assignee: Gekko Technology Limited, Kenilworth (GB)

( * ) Notice: Subject to any disclaimer, the term of this patent is extended or adjusted under 35 U.S.C. 154(b) by 78 days.

(21) Appl. No.: 11/100,023

(22) Filed: Apr. 6, 2005

(65) Prior Publication Data

US 2005/0225980 A1 Oct. 13, 2005

(30) Foreign Application Priority Data

Apr. 7, 2004 (GB) ................................ 0407847.3

(51) Int. Cl.
| | |
|---|---|
| F21V 9/00 | (2006.01) |
| F21V 1/00 | (2006.01) |
| F21V 19/02 | (2006.01) |
| F21V 17/02 | (2006.01) |
| G03B 15/02 | (2006.01) |
| G03B 17/50 | (2006.01) |
| G03B 13/00 | (2006.01) |

(52) U.S. Cl. ...................... 362/230; 362/248; 362/321; 362/16; 362/18; 362/289; 396/34; 396/106; 396/108; 396/109

(58) Field of Classification Search ................ 362/248, 362/321–325, 16, 18, 289; 396/34
See application file for complete search history.

(56) References Cited

U.S. PATENT DOCUMENTS

| | | | | |
|---|---|---|---|---|
| 1,885,419 A | * | 11/1932 | Dina ........................... 362/321 |
| 2,747,459 A | * | 5/1956 | Morrison ..................... 355/70 |
| 3,166,253 A | * | 1/1965 | Aron ........................... 362/224 |
| 3,333,094 A | * | 7/1967 | Steel ........................... 362/283 |
| 3,538,825 A | * | 11/1970 | Taylor ........................... 362/4 |
| 4,052,607 A | * | 10/1977 | Larson ......................... 362/18 |
| 4,200,902 A | * | 4/1980 | Intrator ......................... 362/17 |
| 4,423,470 A | * | 12/1983 | Naito et al. ................... 362/17 |
| 4,987,433 A | * | 1/1991 | Gandrud ..................... 396/190 |
| 5,010,412 A | | 4/1991 | Garriss |
| 5,347,432 A | * | 9/1994 | Chiavetta ..................... 362/18 |
| 5,450,291 A | * | 9/1995 | Kumagai ....................... 362/3 |
| 5,515,119 A | * | 5/1996 | Murdock et al. ........... 352/131 |
| 5,541,686 A | * | 7/1996 | Stephenson ................. 396/164 |
| 5,580,163 A | * | 12/1996 | Johnson, II ................. 362/285 |
| 5,690,417 A | * | 11/1997 | Polidor et al. .............. 362/244 |
| 6,033,087 A | * | 3/2000 | Shozo et al. ................ 362/244 |

(Continued)

FOREIGN PATENT DOCUMENTS

DE 20008703 U1 9/2000

(Continued)

Primary Examiner—John Anthony Ward
Assistant Examiner—David J Makiya
(74) Attorney, Agent, or Firm—Richard M. Goldberg (57) ABSTRACT

Lighting apparatus for an image-gathering device, includes a light frame supporting a plurality of light emitting diode lamps configured to emit light at a tungsten balanced colour temperature, and a focussing frame comprising a plurality of light focussing lenses configured to focus light emitted from said light frame into an elliptical beam. The focussing frame is configured to focus light into an elliptical beam to complement a subject illumination area frame having a ratio 16:9. The light emitting diode lamps are configured to emit light at a colour temperature of 3200 Kelvin or 5600 Kelvin, and to emit light having a colour rendering index of 90. The focussing frame is releasably mountable to the light frame.

20 Claims, 12 Drawing Sheets

U.S. PATENT DOCUMENTS

| | | |
|---|---|---|
| 6,179,439 B1 | 1/2001 | Choate |
| 6,454,437 B1 * | 9/2002 | Kelly ......................... 362/246 |
| 6,547,409 B2 * | 4/2003 | Kiest et al. .................... 362/33 |
| 6,578,969 B1 * | 6/2003 | Hinsching et al. ............ 353/97 |
| 6,688,755 B2 * | 2/2004 | O'Meara .................... 362/259 |
| 6,749,310 B2 | 6/2004 | Pohlert et al. |
| 6,824,283 B2 * | 11/2004 | Pohlert et al. ................ 362/11 |
| 2002/0044435 A1 | 4/2002 | Pohlert et al. |
| 2002/0181231 A1 | 12/2002 | Luk |
| 2003/0072156 A1 | 4/2003 | Pohlert et al. |
| 2003/0128542 A1 | 7/2003 | Pohlert et al. |
| 2004/0129860 A1 * | 7/2004 | Thibaud et al. ............. 250/205 |

FOREIGN PATENT DOCUMENTS

| | | |
|---|---|---|
| DE | 19942177 A1 | 3/2001 |
| DE | 10031303 A1 | 1/2002 |
| EP | 1072884 A2 | 1/2001 |
| GB | 1 332 412 | 10/1973 |
| GB | 1332412 | 10/1973 |
| GB | 2087592 A | 5/1982 |
| GB | 2 321 565 | 7/1998 |
| GB | 2321565 A | 7/1998 |
| IE | 000790 | 4/2001 |
| JP | 59-060327 | 4/1984 |
| JP | 62-235787 | 10/1987 |
| JP | 09-033445 | 2/1997 |
| JP | 11-002598 | 1/1999 |
| JP | 11-066397 | 3/1999 |
| JP | 2003-177454 | 6/2003 |
| WO | 9849872 A1 | 11/1998 |
| WO | 9930537 A1 | 6/1999 |
| WO | 9936336 A1 | 7/1999 |
| WO | 9957945 A1 | 11/1999 |
| WO | 0201921 A1 | 1/2002 |

* cited by examiner

LIGHTING APPARATUS

CROSS-REFERENCE TO RELATED APPLICATION

This application claims priority to United Kingdom Patent Application No. 04 07 847.3, filed, 7 Apr. 2004, the entire disclosure of which is incorporated herein by reference in its entirety as if fully set forth herein.

FIELD OF THE INVENTION

The present invention relates to a lighting apparatus, in particular to a lighting apparatus for an optical image-gathering device.

BACKGROUND OF THE INVENTION

The use of supplemental or enhanced illumination to modify ambient light, or light from an additional source, when performing still or motion optical image gathering is known. For example, it is often desirable to reduce the area or intensity of shadowing on an individual target. In the film, television and photographic industries, illumination of human faces is often tailored to enable a shadow free image of the face to be gathered. This may be achieved by the provision of a light source for the optical image gathering apparatus. For example, it is common to provide illumination of a small foreground area with sufficient intensity to match the background light.

Supplemental illumination may be provided by a light source either supported on a stand or mounted to the image-gathering device. The light source may comprise a single lamp or a plurality of lamps, for example arranged in a circular array. Lamps may be battery powered or mains voltage powered.

Lighting may be provided in the form of a battery powered halogen quartz light source, or a tungsten filament light with a Fresnel glass front element to focus the beam. This type of light source is commonly clamped to the top of the image-gathering device. A problem with this arrangement is that the light source is off the lens axis, which creates shadowing, and often the quality of the light is harsh. Further, on a portable image gathering device, such an off axis mounted light source modifies the centre of gravity of the light and image gathering device combination, making the apparatus unwieldy to handle. Alternatively, lighting may be provided by a mains voltage powered photoflood or halogen bulb.

A problem with both halogen and tungsten light sources is that the operating electrical requirement of the bulbs, or the physical size of the light source, is such that the light source is not portable and therefore of limited application. For example, the current draw of both these types of bulbs is too high to be provided from a portable battery supply, for example a belt, through a cable of a practical size. It is not desirable to increase the operating voltage beyond that of the industry maximum voltage standard and increasing the size of the cable would create user difficulties. In some cases, it is desirable to attach the light source to a camera dolly or crane system.

BRIEF SUMMARY OF THE INVENTION

According to a first aspect of the invention there is provided lighting apparatus for an image-gathering device, comprising a light frame supporting a plurality of light emitting diode lamps configured to emit light at a tungsten balanced colour temperature, wherein said lighting apparatus further comprises a light shield comprising a mounting plate, a light shield plate hinged to the mounting plate and a geared mechanism allowing adjustment of the angle between said mounting plate and said light shield plate.

According to a second aspect of the invention a bend along the light shield plate defines a main inner portion and an outer brow portion angled with respect to the main inner portion.

According to a third aspect of the invention said plurality of light emitting diode lamps comprises light emitting diode lamps configured to emit light at a colour temperature of 3200 Kelvin or 5600 Kelvin.

According to a fourth aspect of the invention said plurality of light emitting diode lamps comprises light emitting diode lamps configured to emit light having a colour rendering index of 90.

According to a fifth aspect of the invention said light frame takes the form of an annulus ring defining an interior circle having a first diameter to enable the light frame to be located around the barrel of a camera lens.

According to a sixth aspect of the invention said light emitting diode lamps are distributed equidistantly about the circumference of a circle within said annulus ring.

According to a seventh aspect of the invention said focussing frame is releasably mountable to said light frame.

The lighting apparatus may further comprise a colour correction filter frame supporting a colour correction filter and/or a diffusion frame supporting a diffusion screen.

WRITTEN DESCRIPTION OF THE BEST MODE FOR CARRYING OUT THE INVENTION

Figure 1:
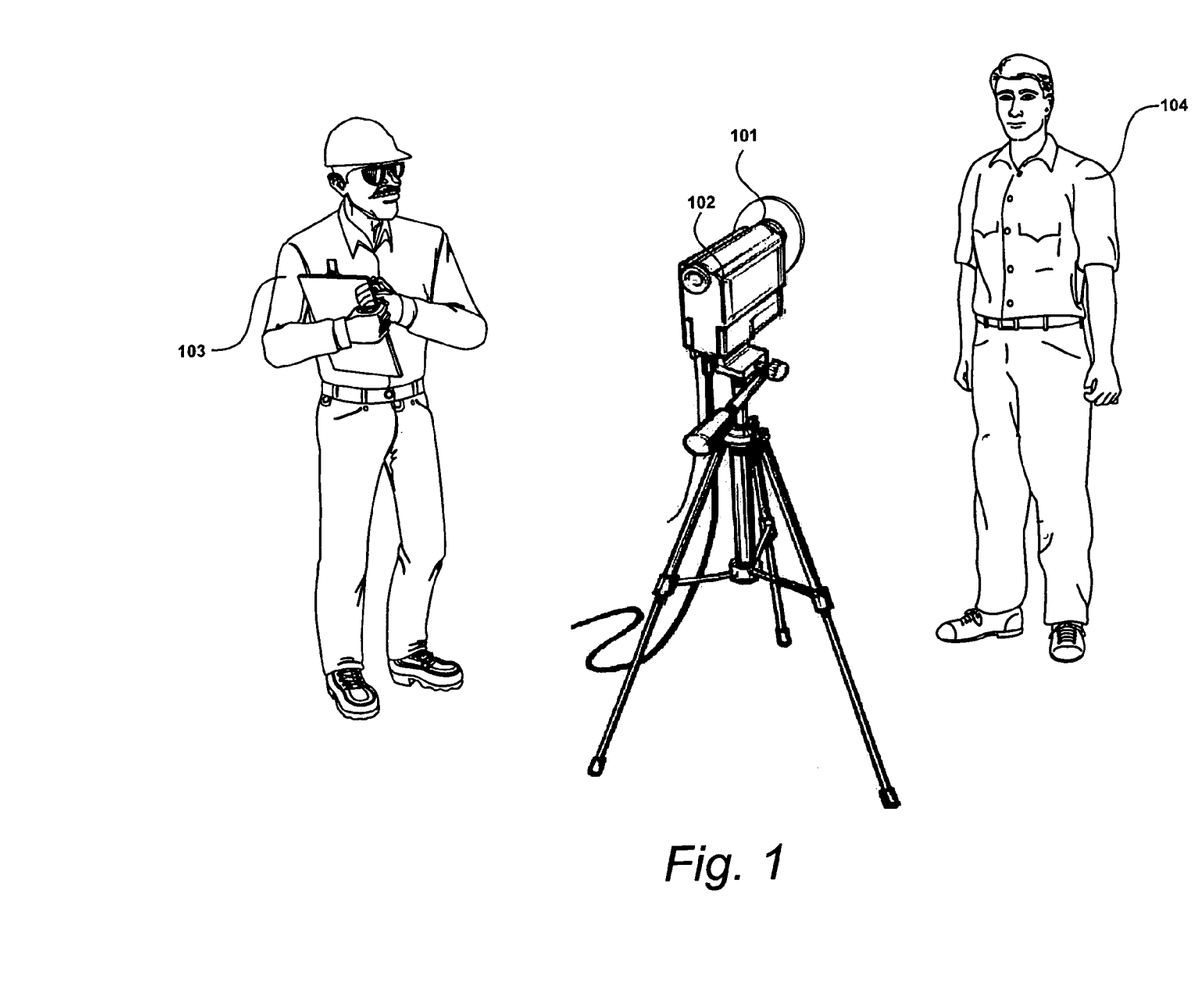
FIG. 1 shows a lighting apparatus.

FIG. 1 shows a lighting apparatus. Lighting apparatus 101 is shown located with respect to an optical image gathering device 102. In this example, optical image gathering device 102 is a hand-held motion picture camera. The image gathering device 102 is useable by an operative, such as camera operator 103, to gather optical images, for example of a human subject 104.

Figure 2:
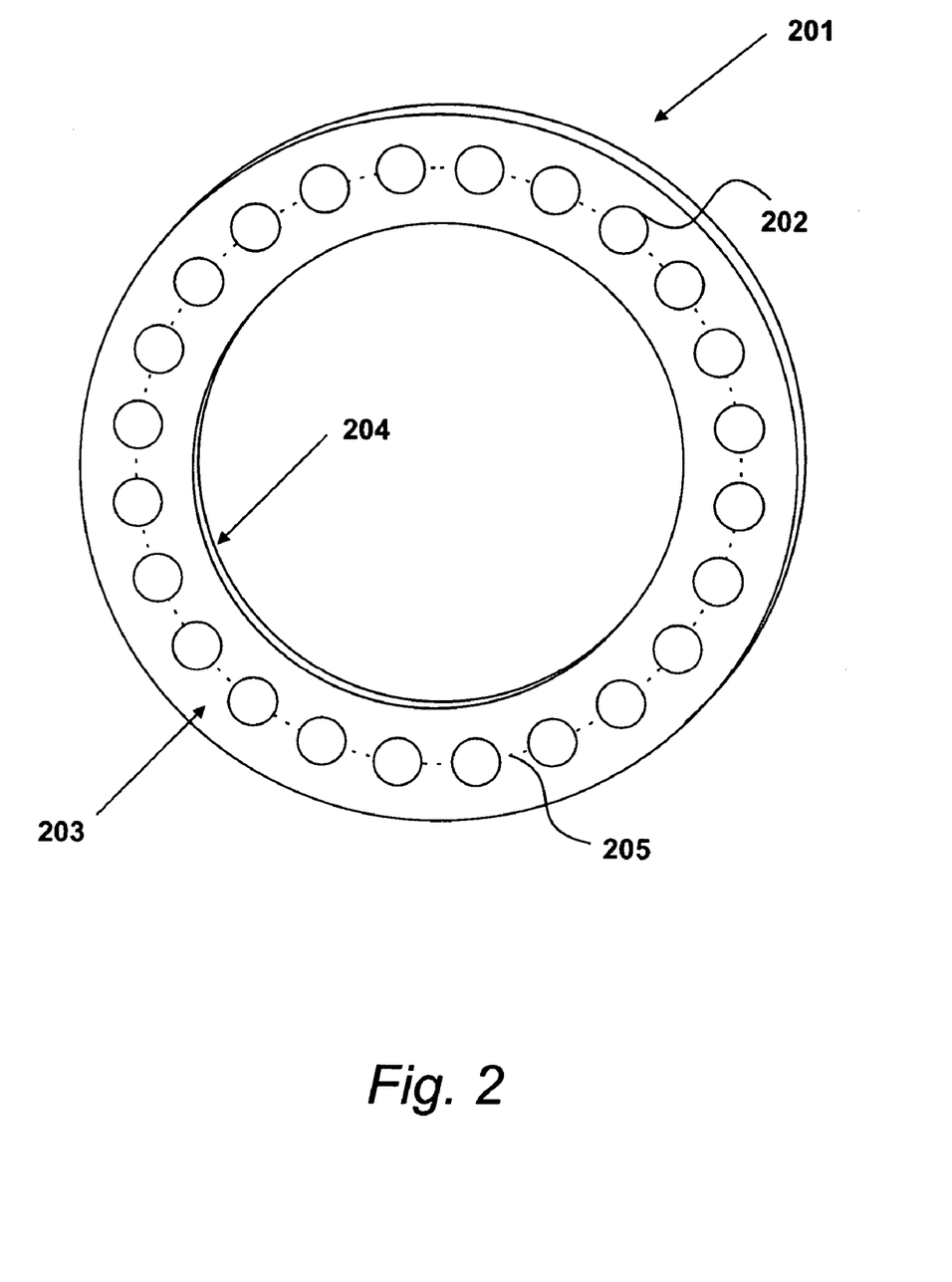
FIG. 2 shows a schematic of a light frame.

Lighting apparatus 101 comprises a light frame, an example of which is illustrated in FIG. 2, supporting a plurality of light emitting diode lamps configured to emit light at a tungsten balanced colour temperature.

Light frame 201 supports a plurality of light emitting diode lamps 202. It is to be appreciated that he number and the arrangement of light emitting diode lamps supported by the light frame may vary between applications. The number and arrangement of light emitting diode lamps may vary according to factors such as the size of the light frame, the size of the light emitting diode lamps and the required spread or intensity of emitted light. The regularity of the arrangement of light emitting diode lamps may vary and/or the spacing between light emitting diode lamps may vary.

The light emitting diode lamps 202 are configured to emit light at a tungsten balanced colour temperature. The term tungsten balanced colour temperature is used herein to refer to emitted light that is suitable for use with a recording medium using tungsten balancing, for example tungsten balanced film stock negative or transparency or video camera program interior settings set to tungsten.

Light emitting diode lamps are selectable according to the Kelvin colour temperature of the light emitted. Correlated colour temperature (Kelvin) is a temperature scale used to designate the spectral output of a source that emits visible light as a result of being heated. The Kelvin colour temperature of emitted light contributes to how that light will appear on a particular recording medium. From this, light emitting diode lamps are selectable according to how the light emitted from the lamps will appear on a recording medium in which tungsten balancing is used. Thus, light emitting diode lamps 202 may be referred to as tungsten balanced light emitting diode lamps.

Light emitting diode lamps that emit light at a tungsten balanced colour temperature are available from Lumileds Lighting, LLC, of San Jose, Calif., under the trademark Luxeon, and suitable light emitting diode lamps include Luxeon I batwing star and emitter types. These types of light emitting diode lamps are often referred to as high power, or high output white, light emitting diode lamps.

Different light sources, artificial and daylight, can have a colour temperature in the range 1000-12000 Kelvin. The lower the Kelvin colour temperature rating, the "warmer" or more yellow the light and the higher the Kelvin colour temperature rating, the "cooler" or more blue the light. Typically, the colour temperature of tungsten balanced light emitting diode lamps is in the range 3000-6000 Kelvin. At 3200 Kelvin colour temperature the light emitted appears white on tungsten interior film, whilst daylight colour temperature is approximately 5600 Kelvin colour temperature. A colour temperature of 5600 Kelvin may be utilised with daylight balanced film stock or video camera exterior settings.

In this example, each light emitting diode lamp 202 is configured to emit light at a colour temperature of 3200 Kelvin. In addition, light emitting diode lamps 202 have a Colour Rendering Index of 90. Colour Rendering Index is a range of numbers from 0-100 used to indicate the effect of a light source on the colour appearance of objects, compared to a reference source of the same Colour Temperate. Colour Rendering Index serves to distinguish between the quality of light sources, with 100 indicating the highest quality.

As described, at 3200 Kelvin colour temperature the emitted light appears white on tungsten interior film, thus providing flattering light. However, the wavelength or Colour Rendering Index is high enough to provide colour reflection to the degree expected in daylight or other light with satisfactory accuracy. The present example light frame provides a warm white solid state light source that replicates the soothing, warm feel typically associated with incandescent and halogen lamps.

The brightness and colour consistency of conventional light emitting diode lamps, which have a lens comprising epoxy, decreases with operating time. For example due to yellowing of the epoxy, such a light emitting diode lamp may lose 30% brightness and colour consistency after 3000 operating hours. The light emitting diode lamps utilised in the present invention are coated with a clear gel that resists lumen depreciation. A suitable coating is a phosphor coating. Resistance to significant lumen depreciation for at least 50000 hours is achievable. The gel coating also functions to prevent undesirable colour variations and halo effects displayed by other solid state light sources.

It is to be appreciated that in use, the light emitting diode lamps 202 emit a cool beam of light and are cool enough to be safe to touch. Furthermore, the light emitting diode lamps 202 are more energy efficient than incandescent and most halogen bulbs.

In the example of FIG. 2, light frame 201 takes the general shape of an annulus having a front face 203 and a rear face 204. Light frame 201 supports twenty-four (24) light emitting diode lamps 202 recessed into the front face 203 of the light frame 201. In this example, the light emitting diode lamps are distributed equidistantly about the circumference of the median circle within the annulus, indicated by dotted line 205.

Preferably, the light frame is fabricated from a material having a relatively low mass, to reduce the overall weight of the lighting apparatus. It is preferable for the inner face of the rear face of the light frame that supports the light emitting diodes to be coated to reduce electromagnetic radiation. A suitable coating is a Nickel loaded conductive paint coating. It is additionally preferable for the front face of the light frame, and other outer surfaces, to present a non-reflecting light absorbent surface, which may also be provided by a coating. The light frame may be constructed from Delrin® engineering plastic or POM-H, in black. Suitable material is available from DuPont (UK) Limited, England.

Light frame 201 is configured to be located about the barrel of a fixed barrel internal focus camera lens, as shown in FIG. 1, such that the light frame 201 is an extension of the lens lying parallel to the focal plane. The arrangement of the array of light emitting diode lamps 202 is such that light is emitted forward in a 360 degree circle forming a cone of light that provides even continuous illumination of a subject from all sides, providing for shadow free gathered images. However, in some situations a more focussed beam or a tighter beam angle may be required.

The light frame of the present invention lighting apparatus may be configured to be mounted to another component and/or to have another component mounted thereto. A variety of mounting means or interlocking means may be provided, including apertures, threaded apertures, sockets, pegs, clips and threaded bars.

Figure 3:
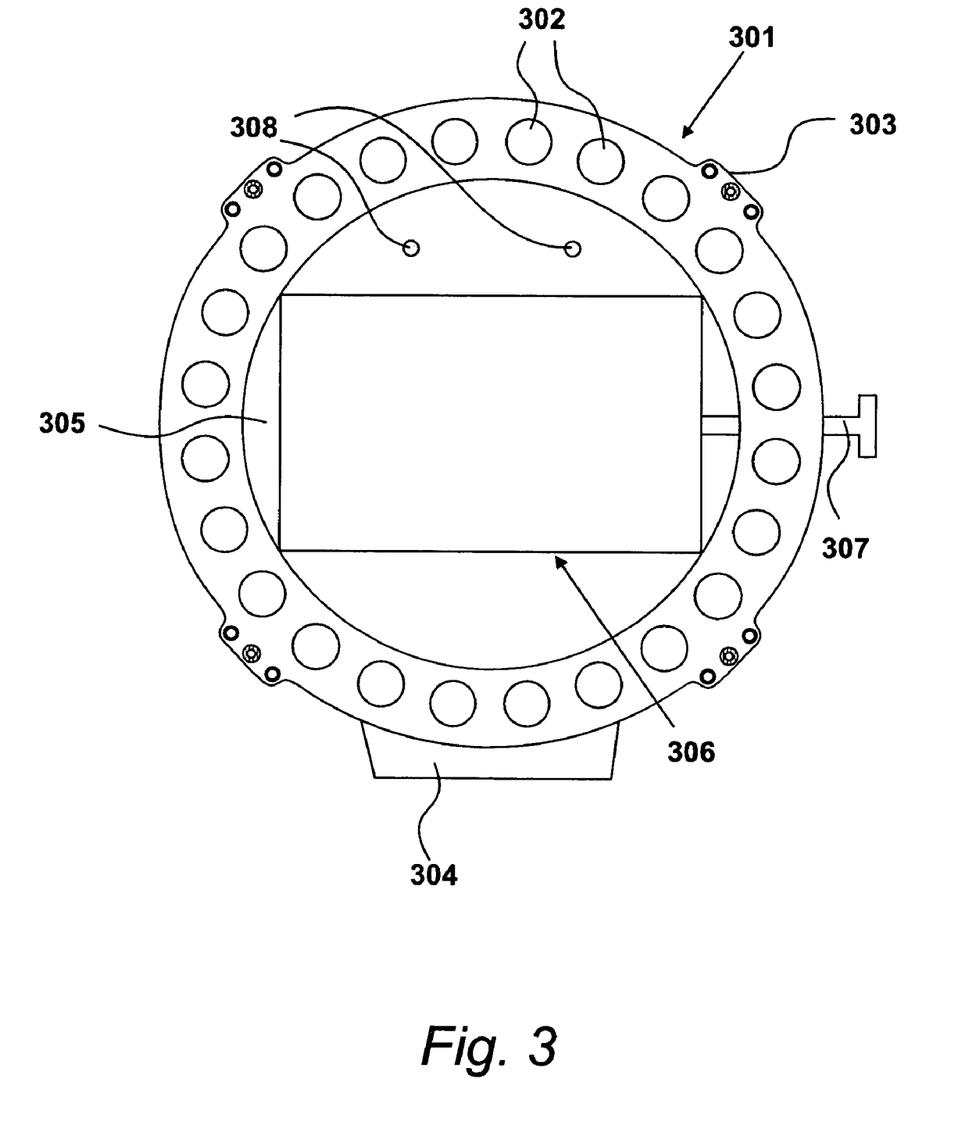
FIG. 3 shows a light frame.

FIG. 3 shows a light frame having mounting means. Light frame 301 takes the form an annulus ring and supports an array of tungsten balanced light emitting diode lamps 302. In this example, light frame 301 supports twenty-four (24) light emitting diode lamps 302 in a similar ring arrangement to that shown in FIG. 2.

As shown, light frame 301 is provided with mounting tabs 303, extending from the circumference thereof. In this example, light frame 301 is provided with four mounting tabs uniformly spaced around the circumference thereof. Each mounting tab 303 defines at least one aperture configured to receive a screw or peg. In practice, the type(s) of mounting tab, the number of a particular type of mounting tab and the positioning of mounting tabs may vary between applications to accommodate different attachments.

Light frame 301 is provided with an adapter clamp mounting tab 304, extending along and outwardly from the circumference thereof and positioned at the bottom of the light frame 301. Mounting tab 304 enables attachment of an adapter clamp to the light frame 301.

Light frame 301 is shown provided with a support member 305 that defines a filter tray aperture 306 interior of the annulus ring of the light frame 301. In this example, support member 305 is substantially planar, and is mounted to the rear face of the light frame 301 to extend radially inwardly across into the interior of the annulus ring of the light frame 301. A manually adjustable filter tray clamp 307 is provided for holding a filter tray in place once located with respect to the filter tray aperture 306, which in this example is substantially rectangular. It is to be appreciated that filters of different sizes are available and may be accommodated by the light frame by provision of different tray clamps and/or different and/or adjustable support members. A light frame may be provided with a plurality of support members, mounted one in front of another.

Support member 305 defines mounting apertures 308 at a position above the filter tray aperture 306, for example to enable attachment of a light shield.

Figure 4:
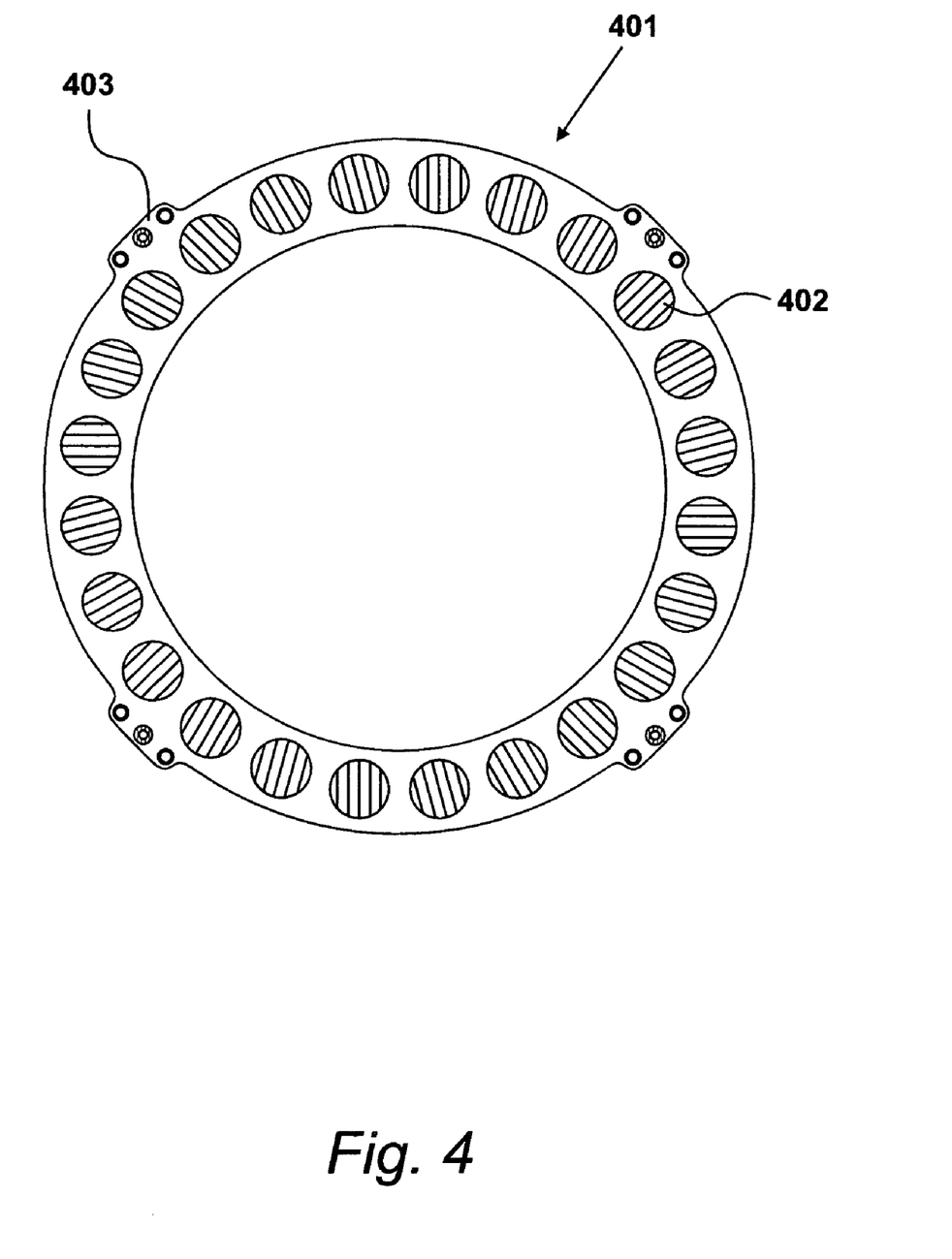
FIG. 4 shows a focussing frame.

FIG. 4 shows a focussing frame comprising a plurality of light focussing lenses for focussing light beams emitted from the light emitting diode lamps of a light frame.

Focussing frame 401 comprises an array of light focussing optical lenses 402. Focussing frame 401 is releasably mountable to light frame 301. Focussing frame 401 is provided with mounting tabs 403 that correspond to the mounting tabs 303 of light frame 301. Mounting tabs 403 may take the same form as mounting tabs 303 to enable the two frames 401, 301 to be secured together with a peg or screw based fixing. In addition, in accordance with this example, each light focussing lens 402 corresponds to a light emitting diode lamp 302 of light frame 301.

Optical lenses suitable for use with light emitting diode lamps are available that are fabricated from lens quality polycarbonate. Such lenses exhibit high thermal stability and long term durability. Suitable optical lenses are available from Carclo technical Plastics (Slough) Ltd, England, under the trademark Classic, and include optical lenses suitable for use with Luxeon® high brightness light emitting diode lamps. Fresnel lenses are available that can be used with different colour, wattage and package types, and that produce a variety of beam shapes without compromising efficiency. Optical lenses are selectable by different available beam shapes that include narrow, medium and wide circular beam, and narrow and wide elliptical beam.

Figure 5:
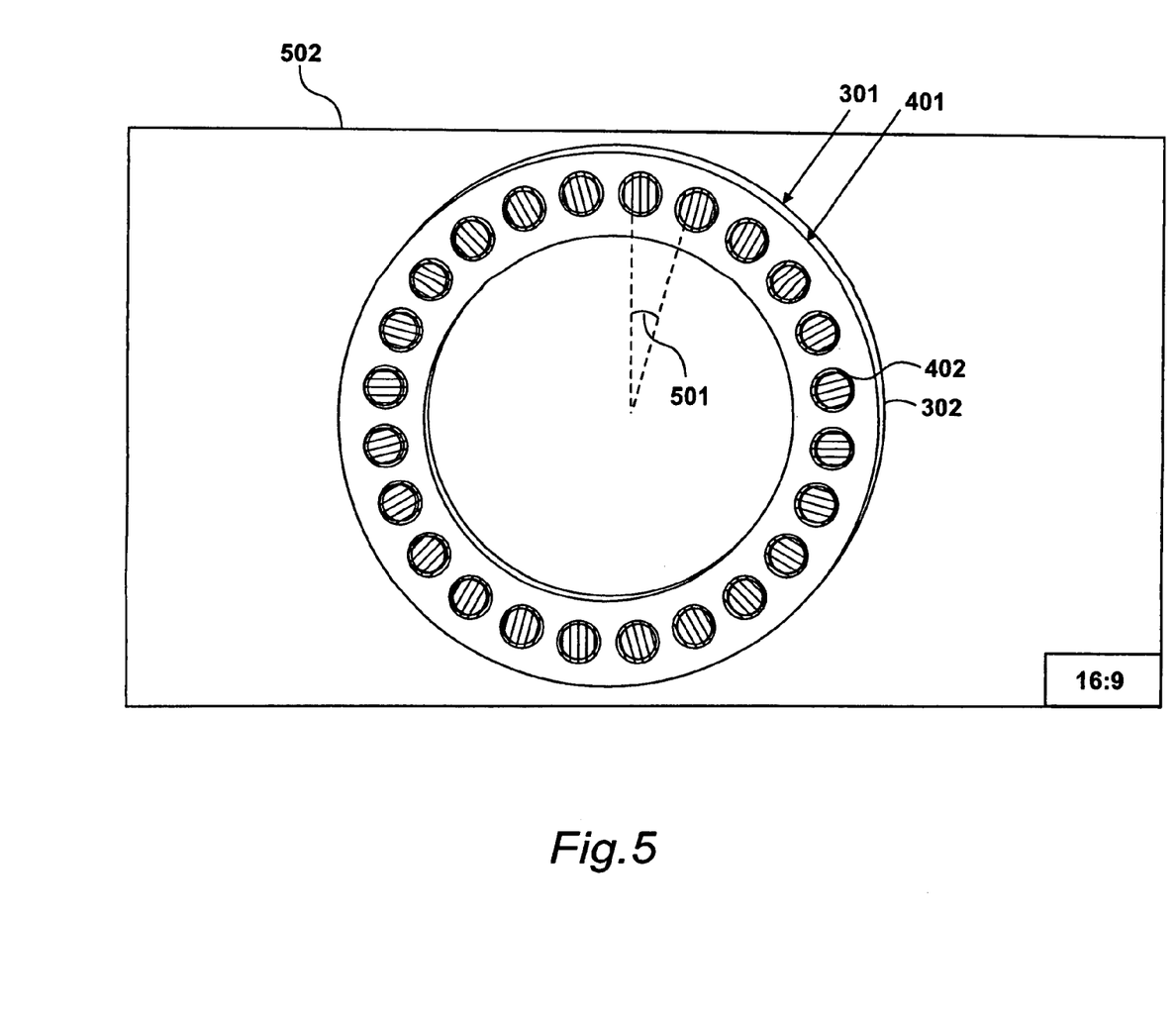
FIG. 5 shows a schematic of the focussing frame of FIG. 4 mounted to the light frame of FIG. 3.

FIG. 5 shows a schematic of focussing frame 401 mounted to light frame 301. The arrangement of the light focussing lenses 402 of focussing frame 401 is such that when the focussing frame 401 is aligned in front of light frame 301 each optical lens 402 is aligned with a corresponding light emitting diode lamp 302 of the light frame 301.

The light focussing lenses 402 can be oriented within focussing frame 401 with an angular offset. Adjusting the angular offset of the optical lenses 402 adjusts the shape of the beam of focussed light. The optical lenses may be aligned by means of a peg and aperture arrangement.

In this example, the light focussing lenses 402 are arranged to focus the light emitted from the light emitting diode lamps 302 into an elliptical or oval cone beam. As shown, the light focussing lenses 402 are arranged in accordance with a circular pattern, with each lens offset with respect to an adjacent lens by an angular increment, indicated at 501.

The light focussing lenses can be offset to focus the emitted light into an optimal beam shape for a frame or background set. For example, optical lenses can be arranged to focus emitted light into an ellipse with combined angles of 16 degrees and 50 degrees to create an elliptical beam pattern optimised to complement a subject illumination area frame 502 having a ratio of 16:9. This elliptical beam shape provides enhanced illumination in the corners of the rectangular frame, compared with a circular cone that produces a bright area in the centre of the frame. According to the present example, this beam shape is achieved by offsetting the light focussing lenses in 14.8 degree increments around the ring of the focussing frame 401.

In some applications, a brighter more focussed beam may be required. Light focussing lenses having a 12 degree lens angle can be utilised to focus the emitted light into a narrower circular beam. Hence, a focussing frame can be used to modify the beam of emitted light to provide the function of a spotlight. Thus, a focussing frame facilitates even illumination of different subject illumination areas.

When preparing to perform image gathering, it is sometimes desirable to modify the Kelvin colour temperature of the light emitted from a light source. This can be achieved using a colour correction filter. The increase or decrease of Kelvin colour temperature on a light source by a colour correction frame is dependent upon the Kelvin colour temperature of the original light source. In industry, correction colour filters are referenced according to the associated mired (micro reciprocal degrees) shift value, which is a constant value allowing the effect of the colour correction filter on a light source to be predicted.

It is known for colour correction filters to be cut as required from disposable gel filter roll. A problem associated with this technique is that the disposable gel filter roll is inconvenient to transport. A further related problem is that filters cut from the roll are readily disposed of, creating undesirable waste.

In combination with tungsten lights it is known to use a colour correction filter, for example a filter to change tungsten light to 5600 Kelvin daylight balanced light. Such filters are made of glass due to the high local temperature reached during operation of the tungsten lights.

Figures 6A, 6C:
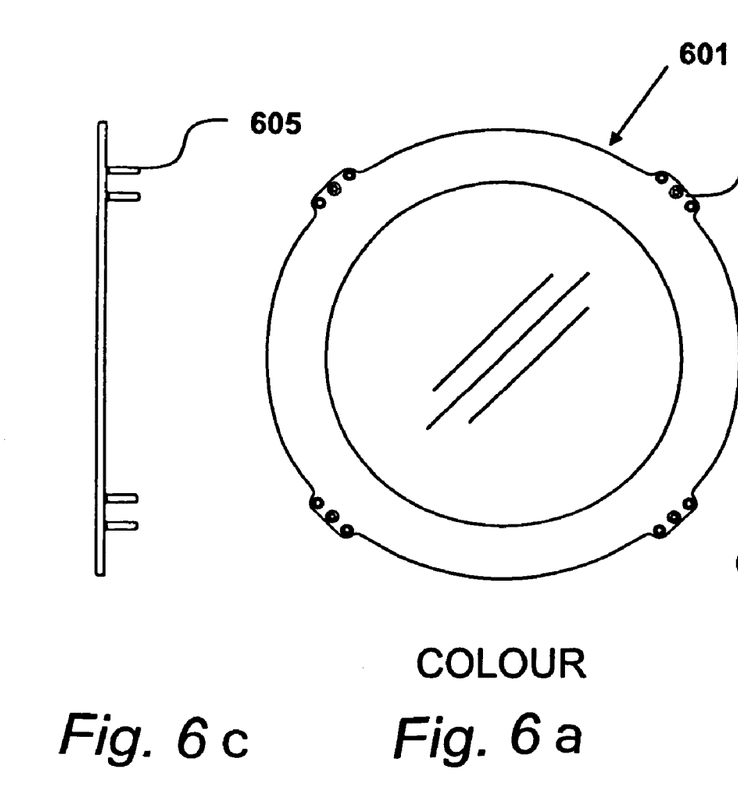
FIGS. 6a-6c show a colour correction filter frame and a diffusion frame.

FIG. 6a shows a colour correction filter frame configured for use in combination with a light frame, in front of the light emitting diode lamps. Colour correction filter frame 601 is configured to be used in combination with light frame 301. Colour correction filter frame 601 is configured to be removably mounted to light frame 301, and is thus provided with mounting tabs, such as mounting tab 602, corresponding to the mounting tabs of light frame 301.

Colour correction filter frame 601 supports a colour correction filter, which in this example is fabricated from 3 mm thick optically clear coloured acetate resin, providing high quality light transmission. The colour of the colour correction frame is correlated to provide the same mired shift as an equivalent disposal gel filter.

Acetate displays the characteristic of being able to withstand the local temperature reached during operation of the light emitting diode lamps utilised in the present invention lighting apparatus. In addition, acetate displays a degree of durability sufficient to provide a colour correction frame that will withstand multiple use. A simple mode of mounting colour correction filter frame 601 to light frame 301 provides a readily available easy to use colour correction filter that adheres to mired shift value referencing.

A colour correction filter may be used to colour the emitted light according to aesthetic criteria or to enhance the colour differential between the foreground and the background. Colour correction filter frames may be provided that emulate ⅛, ¼ and ½ Colour Temperature Orange filters providing a mired shift of +26, +64 and +109 respectively, and that emulate ⅛, ¼ and ½ Colour Temperature Blue filters providing a mired shift of –18, –35 and –78 respectively.

When preparing to perform image gathering, it is often desirable to diffuse the light emitted from a light source. This can be achieved using a diffusion filter.

Figure 6B:
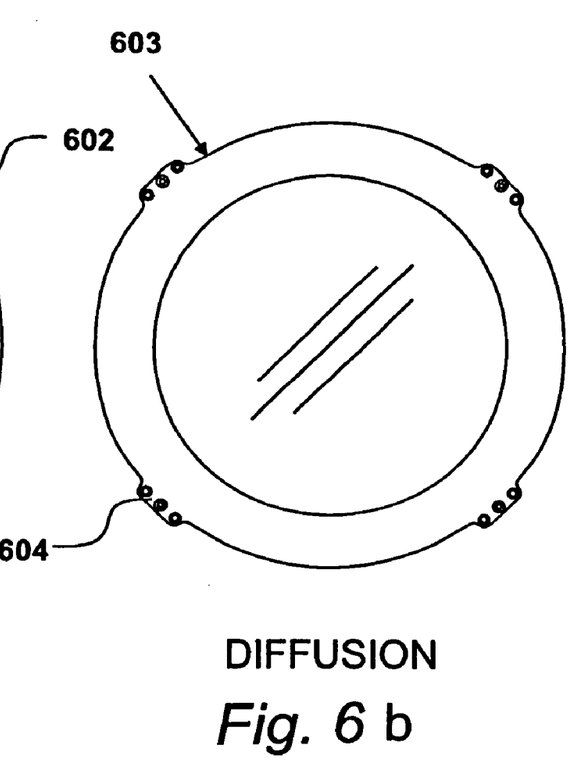

FIG. 6b shows a diffusion frame configured for use in combination with a light frame, in front of the light emitting diode lamps. Diffusion frame 603 is configured to be removably mounted to light frame 301, and is thus provided with mounting tabs, such as mounting tab 604, corresponding to the mounting tabs of light frame 301.

Diffusion frame 603 supports a diffusion screen. The diffusion screen is fabricated from a material that does not cause any change in the Kelvin colour temperature of the light emitted from the light emitting diode lamps of the light frame. Thus, a diffusion frame may be used in place of, or in combination with, a colour correction frame.

A suitable material for manufacture of a diffusion screen is extruded Plexiglas® XT sheet, which is manufactured from prepolymerized polymethyl methacrylate (PMMA) pellets, available from Degussa AG, Germany.

Either or both of the colour correction frame 601 and diffusion frame 603 may be configured to be mounted to the other rather than directly to the light frame 301. The mounting tabs of one or both of the colour correction filter frame 601 and diffusion frame 603 may comprise mounting pegs 605, as shown in FIG. 6c, extending from the rear thereof and configured to slot into a peg receiving aperture o bore formed in another lighting apparatus component.

A template frame, for example having the same shape as colour correction filter frame 601 and/or diffusion frame 603, may be provided. Such a frame can be used as a template for cutting a filter or screen from a roll of material, for example from a disposable gel filter roll.

Figure 7:
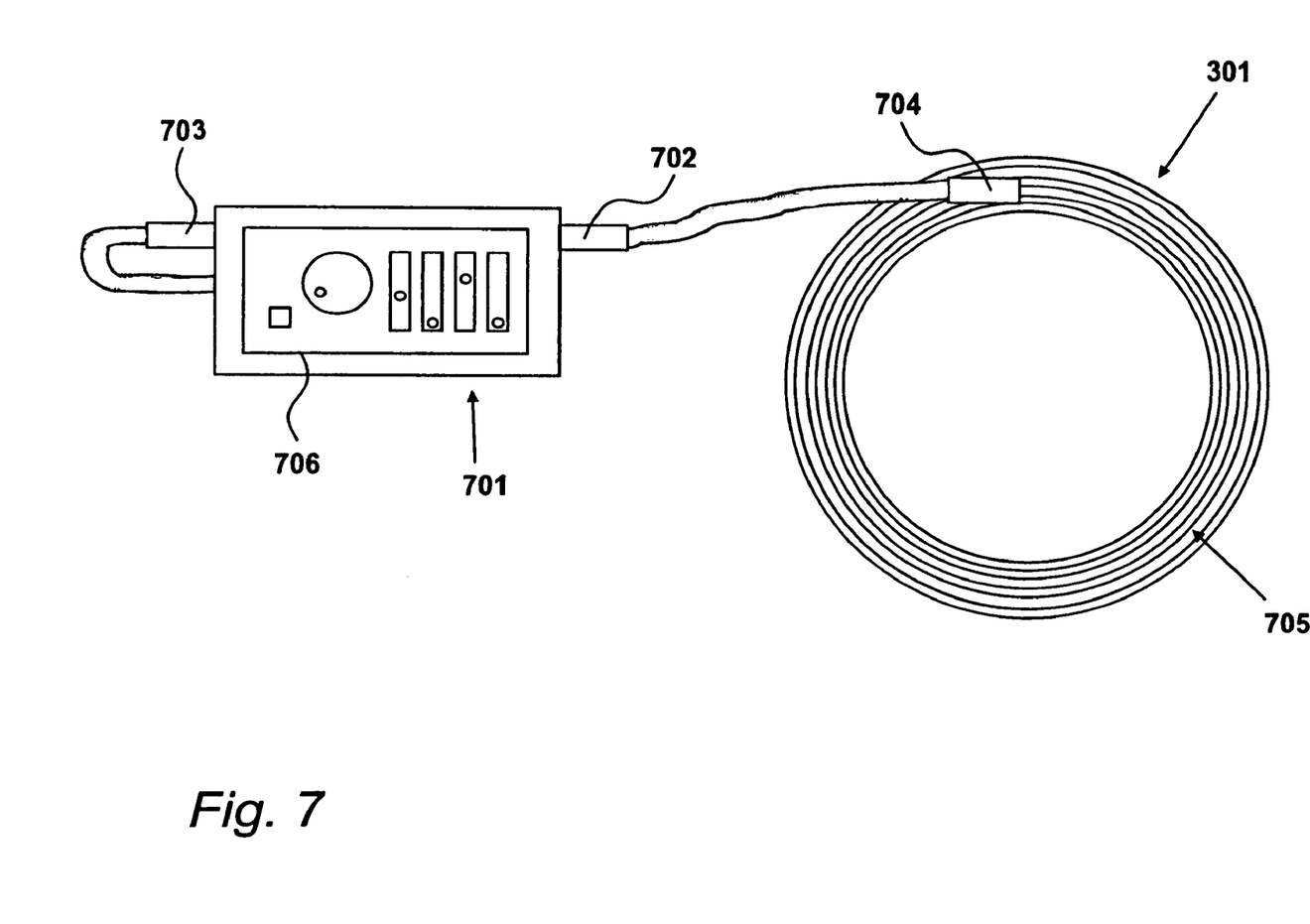
FIG. 7 shows the light frame of FIG. 3 electrically connected to a power regulator unit.

FIG. 7 shows light frame 301 electrically connected to a power regulator unit 701. Power regulator unit 701 is configured to receive a supply power signal at input port 702. Power regulator unit 701 is configured to operate with a direct current 12 volt or 24 volt input, and input port 702 provides electrical connection for each supply. Both these voltages are standard operating voltages in the image gathering industries. A 12 volt dc supply is typically used with video tape cameras and a 24 volt dc supply is typically used with movie film cameras. Thus, the power regulator unit 701 can conveniently be powered by whichever supply is available. Input port 702 may be provided by a 12-24v direct current input XLR 4M socket, available from R S Components, UK.

Power regulator unit 701 is configured to output a variable power square wave supply signal from output port 703. During motion picture image gathering, the number of frames per second recorded is dependent upon industry standards and desired visual effects. For example, image gathering may be performed at the United Kingdom standard of 25 frames per second, at higher frame rate than this or in slow motion. It is therefore desirable to power the light emitting diode lamps with a frequency at which any flickering or strobe effects appearing in gathered images taken at different speeds are overcome. Power supply unit 701 is configured to output a supply power signal having a frequency of 60 KHz. Light frame 301 typically has an operating life up to 10000 hours.

Preferably, the power regulator unit is constructed from a lightweight, robust material for ease of transportation and durability, for example die cast aluminium. Preferably, the inner surface of the power regulator unit is coated with Nickel loaded conductive paint to reduce electromagnetic radiation.

For ease of use, output port 703 of power regulator unit 701 is preferably an elbow connection. Preferably, output port 703 is resistant to temperatures in the range –51 to 60 degrees Celsius, is resistant to humidity, and is also resistant to vibration and shock, to maintain reliability of the apparatus.

Light frame 301 is configured to receive a supply power signal at input port 704. In the example shown, light frame 301 is provided with a ridged backing 705, upon which input port 704 is located. The ridges of backing 705 serve to increase the surface area on the rear of the light frame 301 to aid cooling thereof.

Power supply unit 701 further comprises a panel of manually operable controls 706.

Figure 8:
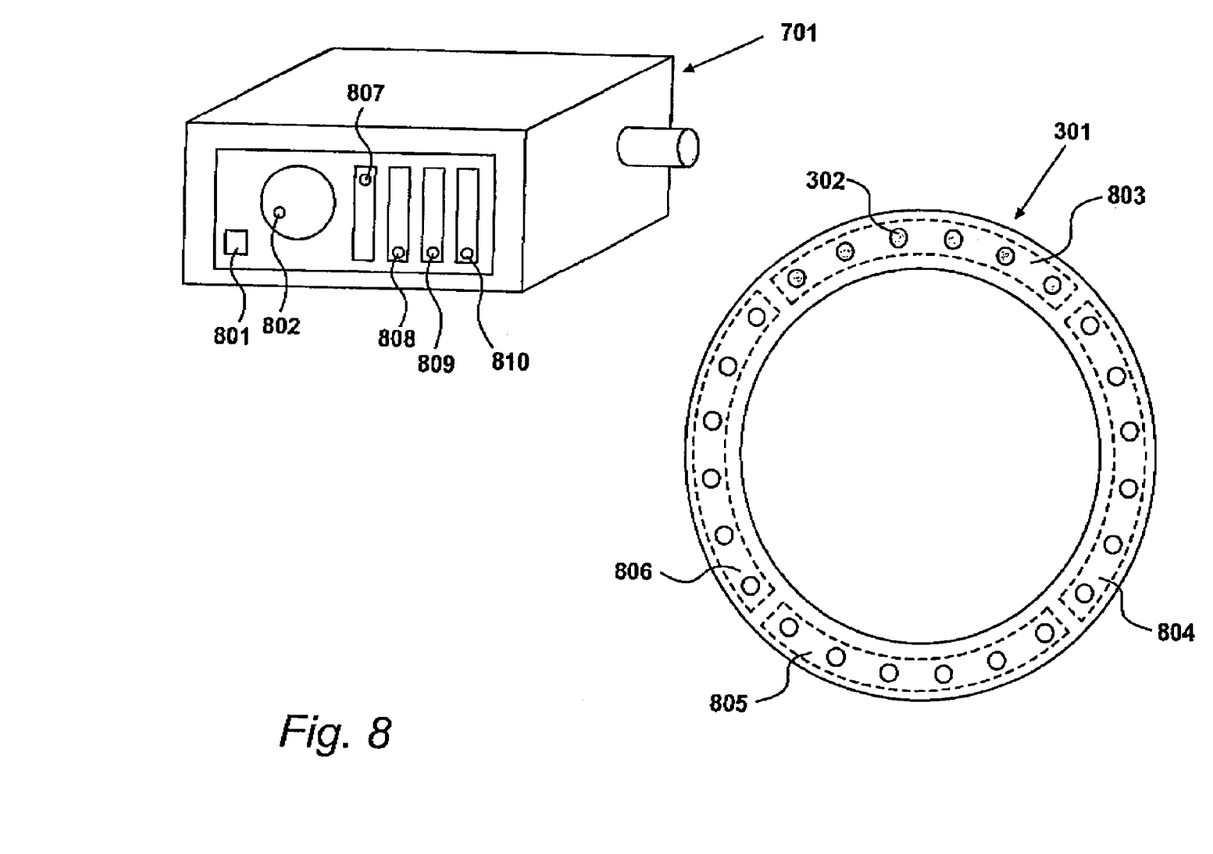
FIG. 8 illustrates independent operation of a subset of light emitting diode lamps of the light frame of FIG. 3.

The manual controls of power supply unit 701 are described in further detail with reference to FIG. 8. Power supply unit 701 comprises a unit on/off switch 801, which in this example also acts as a unit on/off switch for light frame 301. Alternatively, the light frame has an on/off mechanism. In accordance with the present example, the start up delay of light frame 301 is less than 100 ns.

Dimmer control dial 802 provides manual control over the brightness of the light emitting diode lamps. The brightness of the light emitting diode lamps 302 can be selected by varying the position of the dial 802. In this example, operation of dial 802 causes the brightness of each light emitting diode lamp to vary by the same amount. This feature provides control over the brightness of the array, and the ratio between brightness of light emitted by a light frame and background illumination. However, in an alternative embodiment further dimmer control dials or switches may be provided to offer different levels of dimming of different light emitting diode lamps.

To operate, the light emitting diode lamps 302 require a constant current. In addition, the frequency of the supply power signal received at input port 704 is constant. To vary the brightness of the light emitting diode lamps, the power of the square wave supply signal is varied in response to rotation of the dimmer control dial 802. This is achieved by using pulse width modulation to vary the duty cycle of the supply signal. Preferably, the dimming control provides dimming in the range 5-100% brightness. This feature provides for dimming of the light emitting diode lamps 302 without affecting the Kelvin colour temperature of the emitted light. This is desirable since any change the Kelvin colour temperature of the emitted light due to dimming would require compensation using a colour correction filter. Preferably, the power supply unit has dimmer level memory.

Versatility of a supplemental lighting apparatus is particularly appreciated when lighting human faces, since facial features can vary widely between subjects and some facial features, for example deep set eyes or prominent eye brow ridges, can cause shadowing that is difficult to negate.

The light emitting diode lamps of a light frame may be arranged into independently controllable subsets. For example, the twenty four (24) light emitting diode lamps of light frame 301 are divided into four subsets 803, 804, 805, 806 of six (6) light emitting diode lamps each, and in this example are arranged as top, bottom, left and right sectors. Corresponding to each of these subsets 803, 804, 805, 806 is an on/off switch 807, 808, 809, 810 respectively. As shown, this arrangement provides for a subset of light emitting diode lamps, such as subset 803, to be switched off whilst the other light emitting diode lamps remain switched on. This feature provides for a fractional cone of light to be emitted.

The number of subsets of light emitting diode lamps and the number of light emitting diode lamps in a subset may vary according to requirements. Light emitting diode lamps that are not adjacent one another may be grouped into a subset and the light emitting diode lamps of a light frame may be grouped into subsets having different numbers of light emitting diode lamps. In applications where more sensitive control is required, each light emitting diode lamp may be arranged to be independently switched on/off and/or dimmed.

In some situations it is desirable to shield the lens of an image gathering device from undesirable light shining upon or entering the lens, for example incident light from the sun or studio backlighting.

Figure 9:
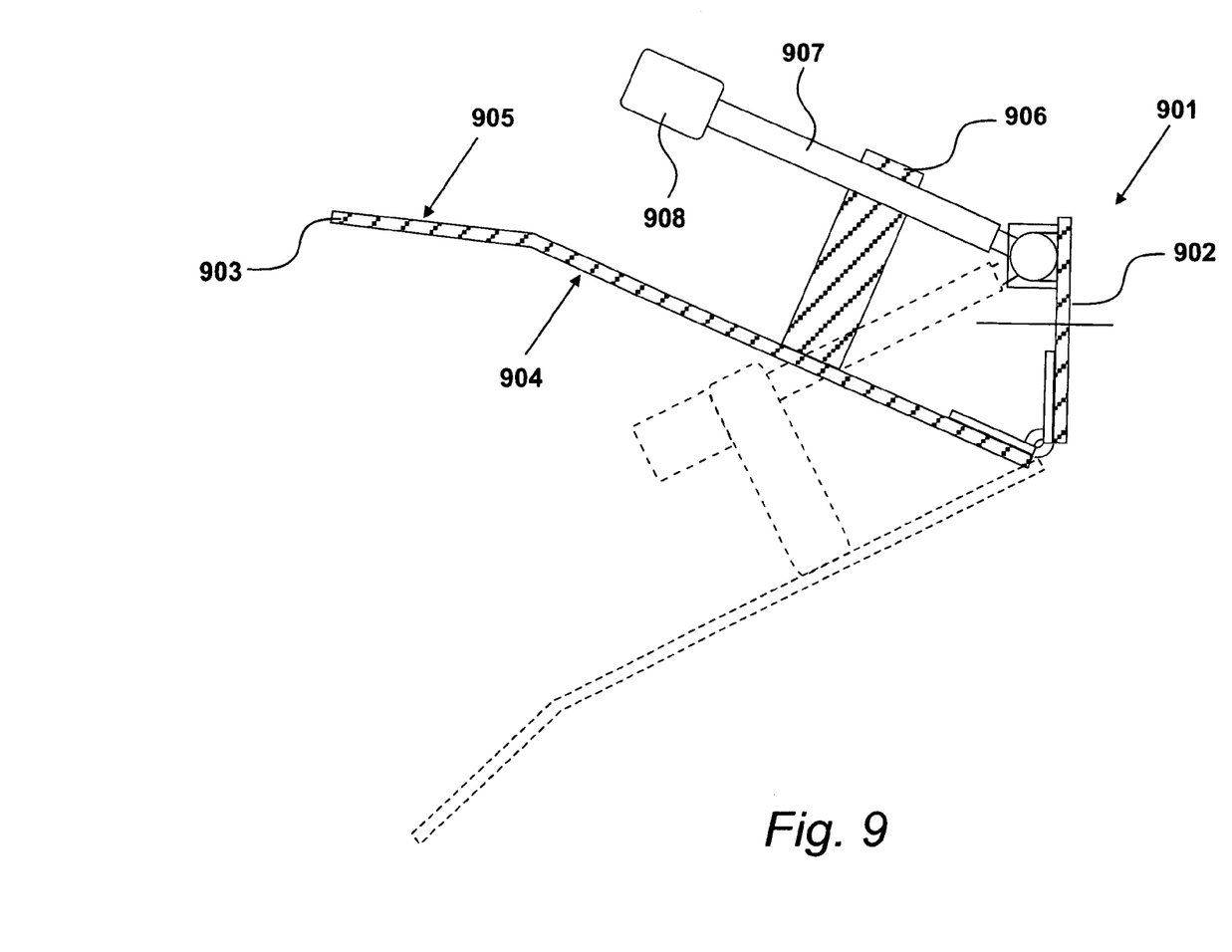
FIG. 9 shows a light shield.

FIG. 9 shows a light shield. Light shield 901 is configured to be mountable to light frame 301 via light shield mounting apertures 308. The light shield 901 comprises a mounting plate 902 that abuts the support member 305 of light frame 301 when mounted to the light frame 301. Hinged to the mounting plate 902 is a light shield plate 903. A bend along the light shield plate 903 defines a main inner portion 904 and an outer brow portion 905 angled with respect to the main inner portion 904. Extending from the light shield plate 903 is a bracket 906 through which a threaded bore extends. Pivotally attached to the mounting plate 902 is an adjustment screw 907, which extends through the threaded bore of bracket 906, and which has an end handle 908 to facilitate manual rotation of the adjustment screw 907. On turning the adjustment screw 907, the angle between the light shield plate 903 and the mounting plate 902 can be varied. This has the effect of raising or lowering the light shield plate 903. As illustrated, turning the adjustment screw 907 such that the bracket 906 moves outwardly along the screw 907 lowers the light shield plate 903.

The screw thread and bracket geared mechanism of light shield 901 provides a more accurate way of positioning the light shield relative to the lens of an image gathering device than friction hold devices of known light shields. Such light shields have a light shield plate hinged to a mounting plate and the angle between the two is manually adjustable to the desired position by feel. However, on release of the light shield the action of the friction device may shift the shield from the position at which the shield was released. Thus, this construction of light shield has an associated lack of accuracy of positioning and unreliable position hold both immediately after release and thereafter.

The geared mechanism of light shield 901 provides a solution to both of these problems by providing predictable adjustment of the angle of the light shield plate 903, whereafter the position is maintained until the adjustment screw 907 is again turned. Thus, the light shield 901 allows for selective blocking of light incident on the lens of an image gathering device.

Preferably, the light shield is fabricated from anodised matte black aluminium. This construction is lightweight for ease of transportation, is rigid for durability and presents a non-reflective surface.

The light frame of the present invention lighting apparatus is configured to be releasably connected to an image gathering device such that the relative position between the lens of the image gathering device and the cone of light emitted from the light frame is maintained during image gathering. This is preferable to, for example, a person holding a light in a desired position nearby; with this scenario the person may become tired or distracted and the position of the light cone may be lost.

To enable the light frame to be located upon camera lens barrels having different diameters, one or more insert rings may be provided to reduce the inner aperture size of the light frame.

Figure 10:
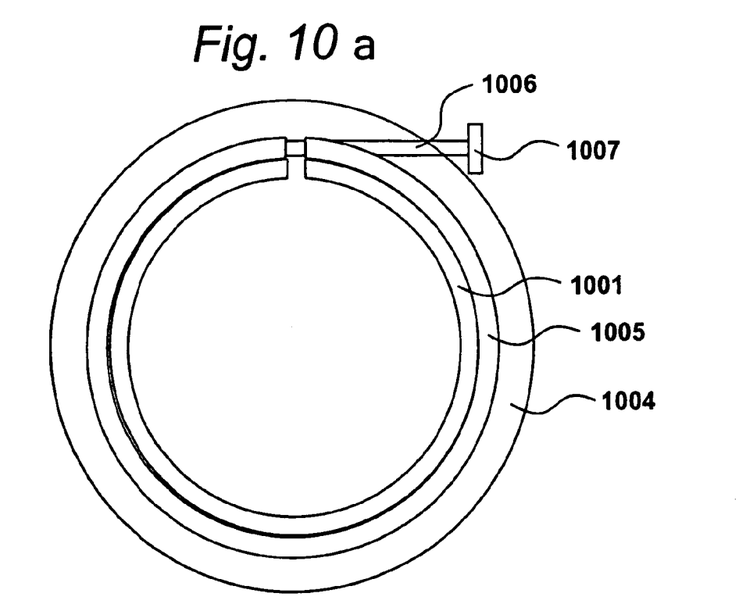
FIGS. 10a-10c show a plurality of insert rings.

FIGS. 10a-10c show three differently dimensioned insert rings 1001, 1002 and 1003. Each insert ring 1001, 1002, 1003 takes the form of a split annulus having a portion thereof at the split removed.

Insert ring 1001 is shown in position relative to light frame 1004. The back of light frame 1004 is provided with a clamping ring 1005. The clamping ring 1005 takes the same shape as insert ring 1001 and is provided with a threaded clamp adjustment screw 1006 that is threaded into the clamping ring 1005 across the gap therein. The clamp adjustment screw 1006 has an end handle 1007 to facilitate manual rotation of the clamp adjustment screw 1006 and turning clamp adjustment screw 1006 causes the gap in the clamping ring 1005 to reduce or increase in size, so as to grip or release an insert ring.

The insert ring is passed from the rear of the light frame 1004 into the clamping ring 1005. The light frame 1004 with a fitted insert ring is then located around the lens barrel of the selected camera. The clamp adjustment screw handle 1007 is then turned in a first tightening direction until the insert ring is sufficiently tightened around the camera lens barrel. To remove or change the insert ring, the clamp screw is turned in the opposite releasing direction until the insert ring 1001 becomes sufficiently loose within the clamping ring 1004.

It can be seen from FIGS. 10a-10c that the outer circumference of each of insert rings 1001, 1002 and 1003 is the same, to enable each to be directly inserted within the clamping ring 1005. However, the annulus thickness of insert ring 1002 is greater than that of insert ring 1001 and the annulus thickness of insert ring 1003 is greater than that of insert ring 1002. Thus, insert ring 1003 provides for attachment of a light frame to a camera lens barrel having a diameter that is smaller than the diameter of the minimum interior circle of insert ring 1002. In an alternative embodiment, a series of "step down" insert rings, with each having an outer diameter corresponding to the inner diameter of another ring so as to allow one to be arranged concentrically of another, may be provided to offer increments of diameter reduction.

Figure 11:
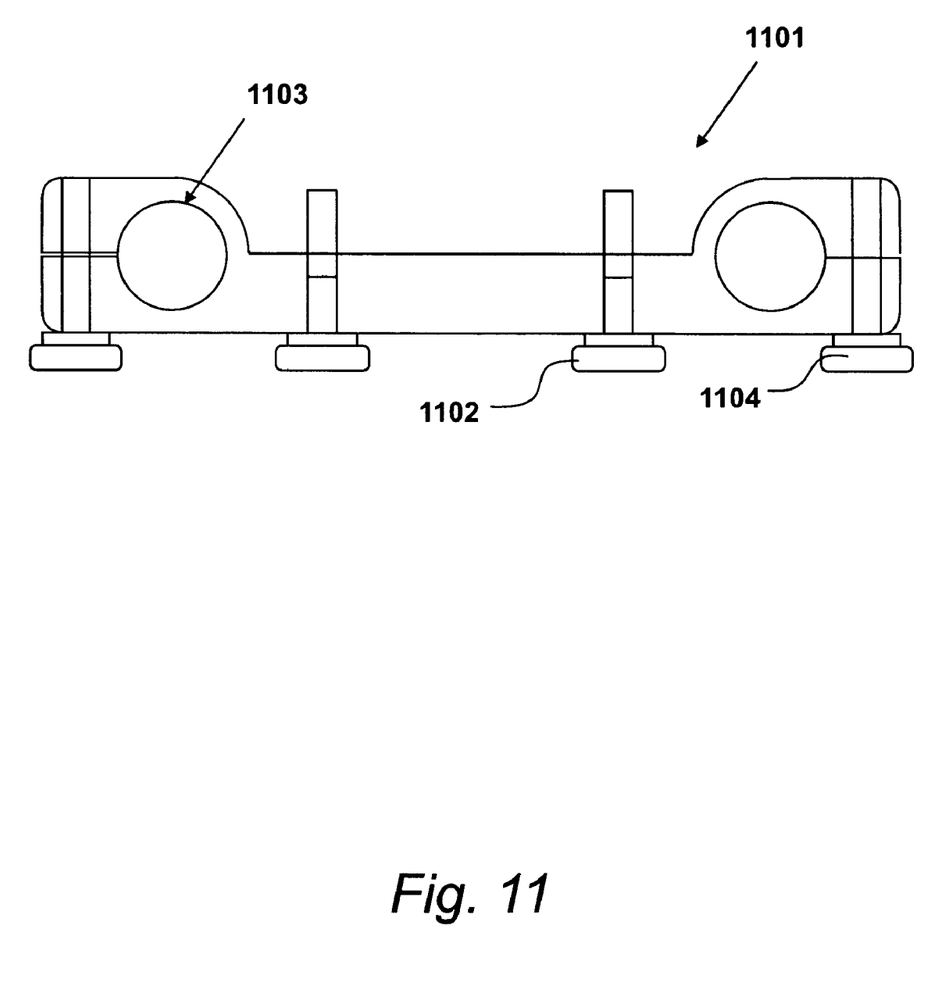
FIG. 11 shows an adapter clamp.

FIG. 11 shows an adapter clamp configured to provide a means of mounting a light frame onto lighting apparatus extension bars, for example 19 mm matte box bars available from Arri Group, of Munich, Germany under the trademark ARRI.

Adapter clamp 1101 is releasably attachable to light frame 301. Adapter clamp 1101 comprises mounting means 1102 configured to allow the clamp to be mounted to adapter clamp mounting tab 304.

The adapter clamp 1101 defines two bar receiving apertures 1103. The clamp 1101 defines a split therethrough extending from each aperture 1103 to the outer surface of the clamp 1101, with the gap across the split being variable by means of a tightening screw 1104. Thus, bars can be inserted into the bar receiving apertures 1103 and releasably gripped therein. Such an adapter clamp enables, for example, external focus lenses to be located relative to a light frame.

Figure 12:
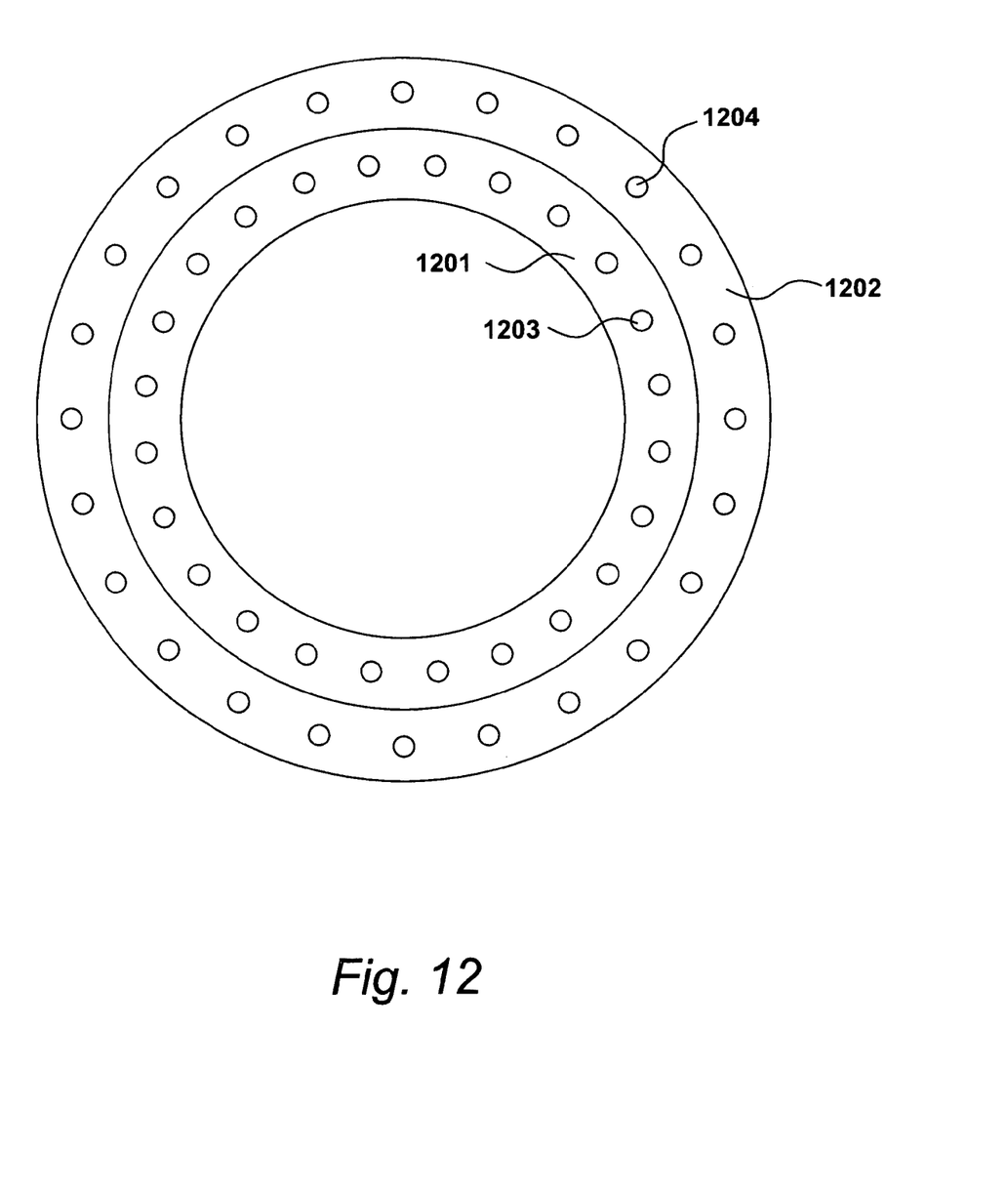
FIG. 12 shows an arrangement of two light frames.

FIG. 12 shows a schematic concentric arrangement of a first ring light frame 1201 and a second ring light frame 1202. Within the arrangement, the light emitting diode lamps 1203 of inner first light frame 1201 and the light emitting diode lamps 1204 of outer second light frame 1202 are offset with respect to each other. Further ring light frame may be located about the first and second light frames 1201, 1202 as desired.

The light emitting diode lamps of a light frame may be individually secured within the light frame or a plurality of light emitting diode lamps may be secured to each other to form a group that is then secured within the light frame.

The light frame of the present invention lighting apparatus is configured to be portable and convenient to use. Further lighting apparatus components are configured to provide quick and easy set up. Lighting apparatus components may be provided that may be arranged to be connected either directly to the light frame or to one or more other components that are connected to the light frame. Lighting apparatus components may be arranged to fit one inside another or to be mounted "piggyback" style. The lighting apparatus may be used with various image gathering equipment, for example hand held cameras or cameras used with a dolly or crane system.

What is claimed is:

1. Lighting apparatus for an image-gathering device, comprising:
   a light frame defining an interior aperture for allowing the light frame to be located around the lens of the image-gathering device and supporting a plurality of light emitting diode lamps exterior of said interior aperture, said light emitting diode lamps configured to emit light at a tungsten balanced colour temperature, and
   a light shield, said light shield comprising:
      a mounting plate, and
      a light shield plate;
   a first connection between said light shield plate and said mounting plate is provided by a hinge, and
   a second connection between said light shield plate and said mounting plate is provided by a manually operable mechanism configured to adjust the angle of said light shield plate relative to said mounting plate;
   said manually operable mechanism is arranged to maintain the angle between said light shield plate and said mounting plate following an adjustment, and
   said lighting apparatus comprises a mounting arrangement configured to enable attachment of said light shield to said light frame interior of said plurality of light emitting diode lamps.

2. Lighting apparatus according to claim 1, wherein a bend along the light shield plate defines a main inner portion and an outer brow portion angled with respect to the main inner portion.

3. Lighting apparatus according to claim 1, wherein said plurality of light emitting diode lamps comprises light emitting diode lamps configured to emit light at a colour temperature of 3200 Kelvin.

4. Lighting apparatus according to claim 1, wherein said plurality of light emitting diode lamps comprises light emitting diode lamps configured to emit light at a colour temperature of 5600 Kelvin.

5. Lighting apparatus according to claim 1, wherein said plurality of light emitting diode lamps comprises light emitting diode lamps configured to emit light having a colour rendering index of 90.

6. Lighting apparatus according to claim 1, wherein said light frame takes the form of an annulus ring defining a circular interior aperture having a first diameter to enable the light frame to be located around the barrel of a camera lens.

7. Lighting apparatus according to claim 6, wherein said light emitting diode lamps are equidistantly distributed about the circumference of a circle within said annulus ring.

8. Lighting apparatus according to claim 6, wherein said lighting apparatus further comprises an insert ring to reduce the diameter of the circular interior aperture of the annulus ring to enable the light frame to be located around the barrel of a camera lens having a second diameter that is less than the first diameter of the light frame.

9. Lighting apparatus according to claim 1, wherein said light shield is releasably mountable to said light frame.

10. Lighting apparatus according to claim 1, wherein said plurality of light emitting diode lamps comprises an independently operable subset of light emitting diode lamps.

11. Lighting apparatus according to claim 1, wherein said lighting apparatus further comprises a power regulator unit configured to provide a variable power square wave supply signal.

12. Lighting apparatus according to claim 11, wherein said power regulator unit is configured to perform pulse width modulation of said supply signal to effect dimming of at least one light emitting diode lamp.

13. Lighting apparatus according to claim 1, wherein said light emitting diode lamps are powered at a frequency of 60 KHz.

14. Lighting apparatus according to claim 1, wherein said lighting apparatus further comprises a colour correction filter frame supporting a colour correction filter.

15. Lighting apparatus according to claim 14, wherein said colour correction filter frame is releasably mountable to said light frame.

16. Lighting apparatus according to claim 1, wherein said lighting apparatus further comprises a diffusion frame supporting a diffusion screen.

17. Lighting apparatus according to claim 16, wherein said diffusion frame is releasably mountable to said light frame.

18. Lighting apparatus according to claim 1, wherein said lighting apparatus further comprises an adapter clamp to enable the light frame to be mounted onto lighting apparatus extension bars.

19. Lighting apparatus according to claim 1, wherein said manually operable mechanism comprises:
   a manually adjustable screw pivotally attached to said mounting plate, and
   a bracket, having a threaded bore, attached to said light shield plate; and
   said manually adjustable screw operably extends through the threaded bore of said bracket such that rotation thereof adjusts the angle between said mounting plate and said light shield plate.

20. Lighting apparatus according to claim 1, wherein said light frame includes a support member and said mounting arrangement is provided by apertures defined in said support member.

* * * * *